United States Patent
Wagner, III

(10) Patent No.: US 6,241,195 B1
(45) Date of Patent: Jun. 5, 2001

(54) EXTENDABLE/RETRACTABLE AIRFOIL ASSEMBLY FOR FIXED WING AIRCRAFT

(76) Inventor: Fred A. Wagner, III, 1530 Queens Rd., Charlotte, NC (US) 28207

( * ) Notice: Subject to any disclaimer, the term of this patent is extended or adjusted under 35 U.S.C. 154(b) by 0 days.

(21) Appl. No.: 09/381,743

(22) PCT Filed: Apr. 8, 1998

(86) PCT No.: PCT/US98/07103

§ 371 Date: Sep. 22, 1999

§ 102(e) Date: Sep. 22, 1999

(87) PCT Pub. No.: WO98/45171

PCT Pub. Date: Oct. 15, 1998

Related U.S. Application Data

(60) Provisional application No. 60/043,171, filed on Apr. 10, 1997.

(51) Int. Cl.[7] .......................................................... B64C 3/54
(52) U.S. Cl. ........................................... 244/218; 244/139
(58) Field of Search .................................... 244/198, 218, 244/46, 49, 139; 114/104–107

(56) References Cited

U.S. PATENT DOCUMENTS

| | | |
|---|---|---|
| 1,215,295 | 2/1917 | MacKay . |
| 2,137,047 | 11/1938 | Gliwa ...................................... 244/43 |
| 2,193,029 | * 3/1940 | Juul ........................................ 244/218 |
| 4,744,534 | 5/1988 | Corbett .................................. 244/218 |
| 4,881,703 | 11/1989 | Nahas ..................................... 244/213 |
| 5,052,641 | 10/1991 | Coleman ................................ 244/218 |
| 5,118,052 | 6/1992 | Alvarez Calderon .................. 244/49 |
| 5,137,229 | 8/1992 | Kraus ..................................... 244/49 |
| 5,711,496 | 1/1998 | Nusbaum ............................... 244/214 |

FOREIGN PATENT DOCUMENTS

| | | |
|---|---|---|
| 1 272133 | 7/1968 | (DE) . |
| 1 756 471 | 8/1970 | (DE) . |
| 567715 | 10/1957 | (IT) . |

* cited by examiner

*Primary Examiner*—Galen L. Barefoot
(74) *Attorney, Agent, or Firm*—Dennis T. Griggs

(57) ABSTRACT

A retractable airfoil assembly (20) augments the wing surface area (28) of an aircraft (22) enabling it to fly without stalling at reduced speeds during takeoff and landing. The airfoil assembly includes flexible sails (42, 44) and a furling mast (24) for extending and retracting the sails. The furling mast includes a furling drum mounted for clockwise and counterclockwise rotation on a static tube (50). The flexible sail assembly also includes guide tracks (80) located along a leading edge (101) or tailing edge (40) of the wings. The tracks guide the flexible sails during extension and retraction. A drive cable (26) extends and retracts the sails (42, 44) along the guide tracks and maintains tension in the sails while they are extended.

11 Claims, 6 Drawing Sheets

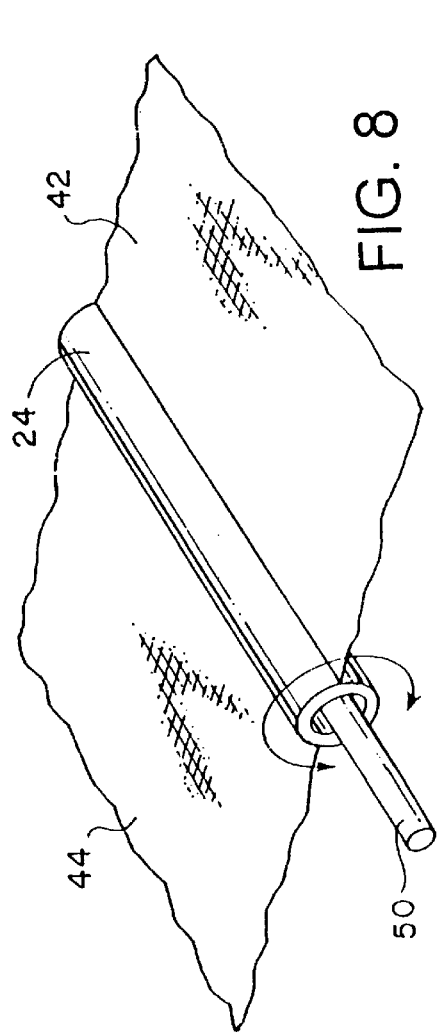
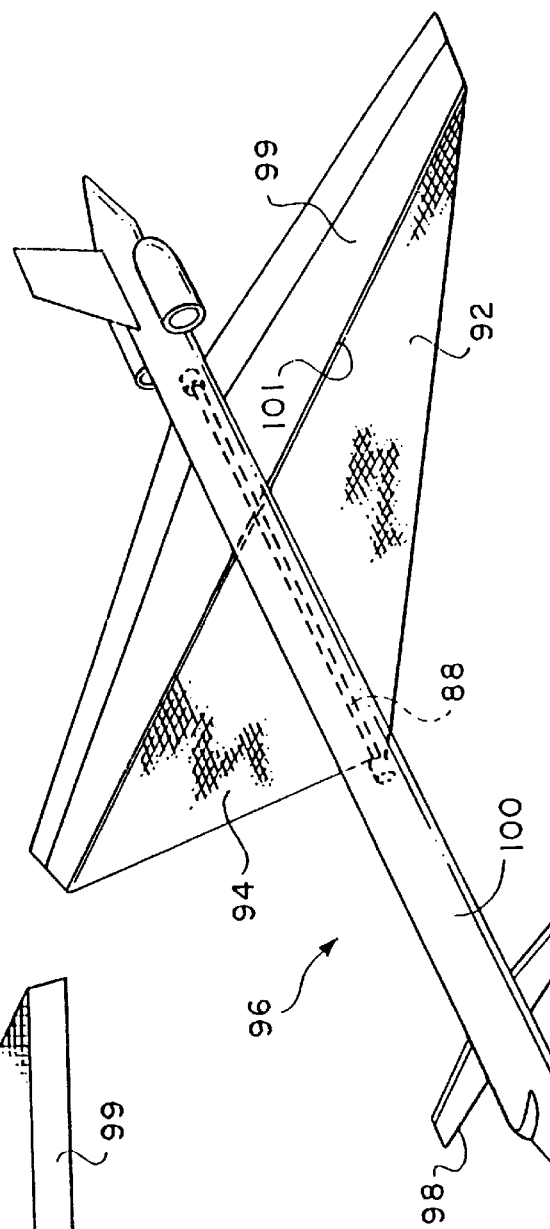
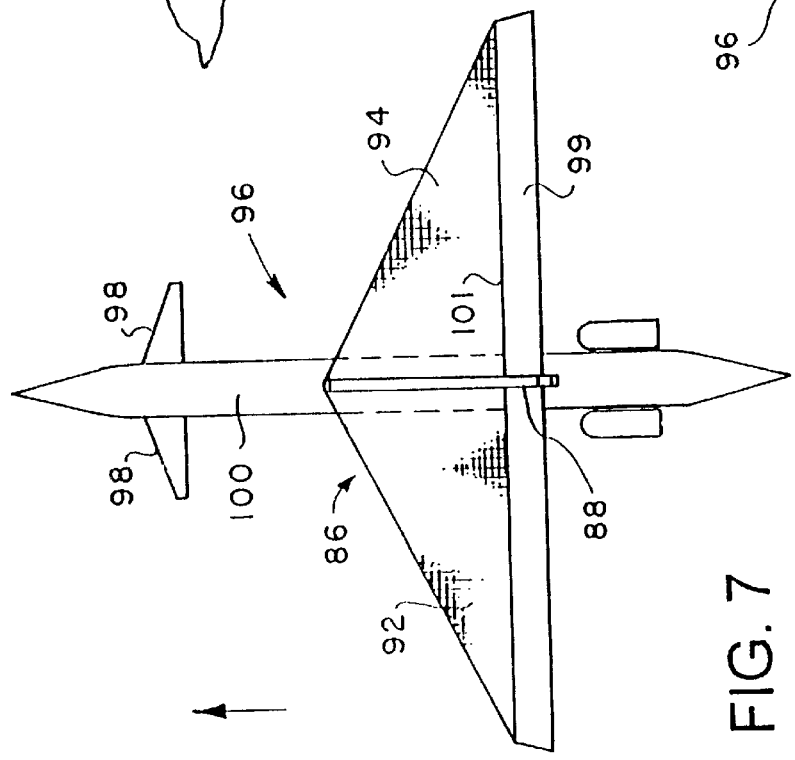

EXTENDABLE/RETRACTABLE AIRFOIL ASSEMBLY FOR FIXED WING AIRCRAFT

This application claims benefit of Provisional No. 60/043,171 filed Apr. 10, 1997 and this application is also a 371 of PCT/US98/07103 filed Apr. 8, 1998.

TECHNICAL FIELD

This invention is related generally to aircraft wing structures, and in particular to a flexible sail that can be selectively extended to enable an aircraft to takeoff and land at reduced air speeds.

BACKGROUND ART

Short takeoff and landing, abbreviated STOL, refers to the ability of an aircraft to clear a 50-foot (15 meter) obstacle within 1500 feet (450 meters) of commencing takeoff, or in landing, to stop within 1500 feet after passing over a 50-foot obstacle. It is desirable under certain conditions for fixed-wing aircraft to be able to perform STOL operations at relatively low air speeds, for example twenty-thirty knots (37–55 kilometers/hr) indicated air speed. This requires either a high ratio of power to aircraft weight or high ratio of wing area to aircraft weight. Slats and flaps are the primary means for increasing the wing area of conventional aircraft. Typically, slats and flaps change the camber as well as increase the effective lift area of the wing. Increased wing area and changes in camber generally yield a greater lifting force on the wing, thereby reducing stall speed.

The benefits of reduced stall speed flight include short takeoff and landing roll. Additionally, reduced stall speed flight can prevent inadvertent stalls and permit high angles of climb, which may be useful at noise sensitive airports or at airports where obstacles encroach the glide path. Landing at slower speeds also decreases the wear and tear on brakes, landing gear assemblies, wing struts and tires.

There are some significant limitations on the use of slats and flaps. Slats and flaps should be retracted during cruising flight to reduce drag. Slats and flaps are complex flight control devices which may substantially increase the weight of an aircraft. Typically, the manufacturing and operating costs of aircraft utilizing slats and flaps are increased by the complexity of developing, manufacturing and maintaining the slat and/or flap assemblies. Also, retrofit installation on aircraft not originally equipped with slats and flaps involves major structural modifications.

Another method used to enable aircraft to takeoff and land at reduced stall speeds is through the development of lift-optimized wing designs. Increasing the camber of the airfoil of a wing can result in increased lift and decreased stall speeds. However, by using too much camber, drag penalties can become excessive for an aircraft operating at cruising speed. The same flight characteristics of the wing are present throughout all phases of flight. Consequently, conventional airfoil designs are optimized for all phases of flight (takeoff, cruise and landing) and must necessarily result in a compromise of various design factors which provide reasonable performance throughout all flight regimes. Conventional methods (installing slats/flaps and changing the airfoil) have been only marginally successful in reducing stall speed.

Instead of increasing the wing surface area, aircraft manufacturers sometimes increase the power available to an aircraft to reduce the takeoff roll. However, there are some limitations on the use of more powerful engines. First, an improved engine can be prohibitively expensive. Installation may not be feasible because of airframe limitations, maintenance can be more extensive, weight and balance factors may be affected and fuel consumption may be drastically increased. Moreover, the increased noise generated by a more powerful engine may not be tolerated at a noise sensitive airport.

Consequently, there is a continuing interest in providing an auxiliary wing structure that can be selectively deployed for enabling fixed wing aircraft to fly without stalling at slower speeds during takeoff and approach to landing, and that can be retracted during other phases of flight. This would permit the aircraft wings to be optimized for high speed cruise, with the auxiliary wing structure being deployed only during takeoff and landing, and retracted during high speed cruising flight.

DISCLOSURE OF THE INVENTION

In accordance with the present invention, a retractable airfoil assembly for augmenting the wing surface area of an aircraft includes a pair of flexible sails coupled to a rotatable boom. Additionally, the retractable airfoil assembly includes means for furling and unfurling the flexible sails on the rotatable boom. The flexible sails are guided in tracks extending along a leading edge or a trailing edge of the main wing during deployment and recovery. The retractable airfoil assembly also includes a guide cable for extending and retracting the sails laterally as the sails are unfurled (extended) and furled (retracted), respectively.

According to one embodiment of the present invention, the retractable airfoil assembly is coupled to the leading edge structure of the main wings of an aircraft. This assembly includes a pair of flexible sails, a furling boom for unwrapping (extending) and wrapping (retracting) the flexible sails and a pair of tracks for guiding the flexible sails along a leading edge structure of the wings during extension and retraction. The retractable airfoil assembly also includes a drive cable attached to the flexible sails for extending and retracting the sails along the leading edge tracks, and for maintaining tension in the sails while they are deployed.

According to another embodiment of the invention, the retractable sail assembly includes trailing edge tracks for guiding the flexible sails along a trailing edge structure of the wings. The flexible sails are extended (unfurled) and retracted (furled) by clockwise and counterclockwise rotation of the furling boom, respectively. A guide cable maintains tension in the sails as the sails are deployed and recovered.

According to yet another aspect of the present invention, the furling boom includes a drum mounted for rotation on a static support tube that is rigidly attached to the aircraft. A pair of flexible sails are attached to the rotatable drum and are unfurled (extended) from the drum or furled (retracted) around the drum as the drum is rotated clockwise or counterclockwise about the static support tube.

BRIEF DESCRIPTION OF THE DRAWING

The accompanying drawing is incorporated into and forms a part of this specification to illustrate the preferred embodiments of the present invention. Throughout the drawing, like reference numerals designate corresponding elements. The construction and operation of the invention will be understood from the following detailed description taken in connection with the appended claims and attached drawing figures in which:

FIG. 7 is a simplified bottom plan view of the retractable airfoil assembly in a fully unfurled configuration coupled to the leading edge structure of a low wing aircraft;

FIG. 8 is a perspective view, partly broken away, of a furling boom including a static support tube, a rotatable drum and a pair of flexible sails;

FIG. 9 is a front perspective view of the low wing aircraft and retractable airfoil assembly of FIG. 7 illustrating the fully deployed, unfurled configuration;

BEST MODE FOR CARRYING OUT THE INVENTION

The present invention enables aircraft to takeoff and land without stalling at reduced speeds through the use of a retractable airfoil that can be selectively extended and retracted on a rotatable boom assembly.

Figure 1:
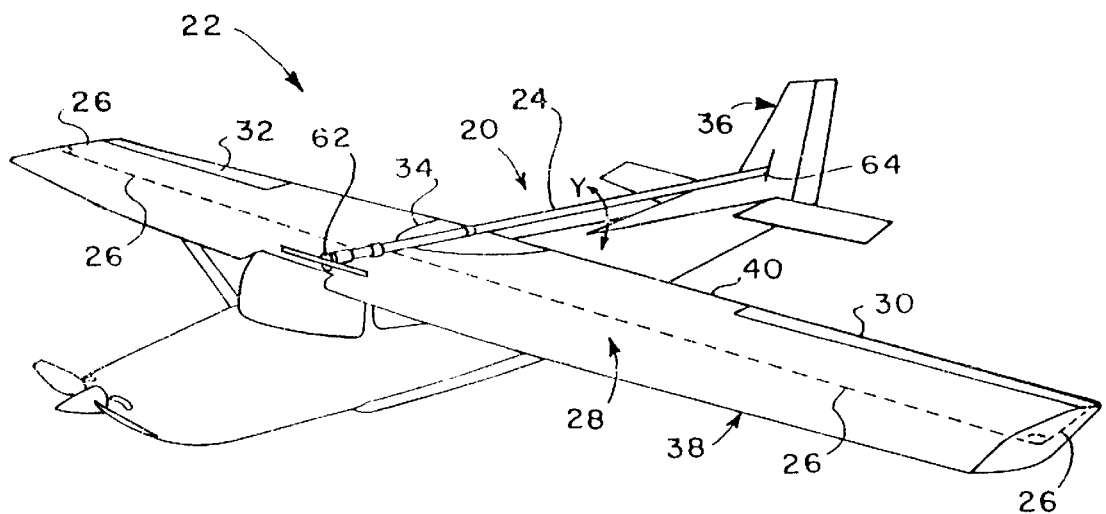
FIG. 1 is a front perspective view of a retractable airfoil assembly in a furled (fully retracted) configuration on a high wing aircraft.

FIG. 1 is a front perspective view of a retractable airfoil assembly 20 in a fully retracted, furled configuration attached to a high wing aircraft 22 according to a trailing edge embodiment of the present invention. The retractable airfoil assembly 20 includes a support boom 24 and a flexible drive cable 26. The aircraft 22 includes a wing 28 having ailerons 30 and 32 and an aerodynamic fairing 34. The aircraft 22 also includes a tail assembly 36.

A forward end portion of the support boom 24 is mounted on the wing 28 at a main wing spar just aft of a leading edge 38 of the wing 28. A rear end portion of the support boom 24 is mounted on the base of the tail assembly 36. The support boom 24 includes a furling drum 52 (FIG. 3) that is rotatable clockwise and counterclockwise about the Y axis (longitudinal).

Figure 2:
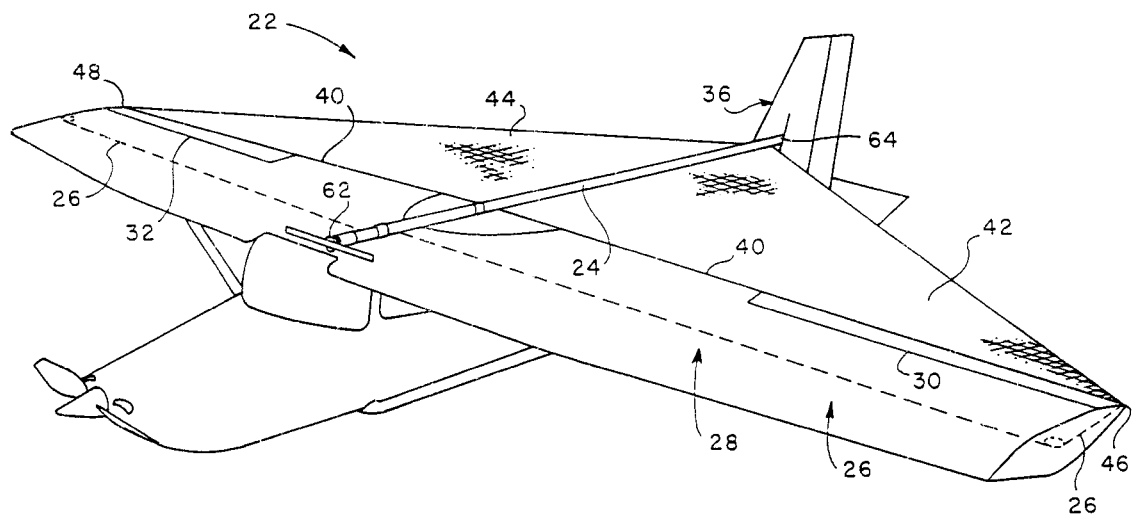
FIG. 2 is a front perspective view of the retractable airfoil assembly of FIG. 1 in an unfurled (fully deployed) configuration.

In the trailing edge embodiment of FIG. 1 and FIG. 2, the drive cable 26 is installed along the trailing edge structure 40 of the wing 28 and transmits the driving force necessary to extend the retractable airfoil assembly 20 to the unfurled configuration. The flexible drive cable 26 includes a flexible cable which runs in a continuous loop midway aft across the wingspan of the wing 28. A chain with drive sprockets can be substituted for the flexible cable. The flexible drive cable 26 is routed rearwardly through a series of pulleys and across the trailing edge 40 of the wing 28. Preferably, the flexible drive cable 26 is located internally of the wing structure 28. However, the flexible drive cable 26 may also be routed along the top side or along the underside of the wing 28, depending on placement of the wing in relationship to the fuselage (e.g., on low wing aircraft the flexible drive cable 26 may be installed along the underside of the wing).

Referring now to FIG. 2, the retractable airfoil assembly 20 includes a left flexible sail 42 and a right flexible sail 44. The left sail 42 runs aft of the left side of the trailing edge 40 from the left wingtip 46 to the support boom 24 and extends diagonally aft to the base of the tail assembly 36. The right sail 44 is constructed in mirror image relation to the right sail 42 and runs aft of the right side of the trailing edge 40 from the right wingtip 48 to the support boom 24 and also extends diagonally aft of the base of the tail assembly 36. The left sail 42 and the right sail 44 are attached along the length of the furling drum 52 as shown in FIG. 3 and FIG. 8.

Both the left sail 42 and the right sail 44 are attached to opposite ends 26A, 26B of the drive cable 26, for extending an retracting the left sail 42 and the right sail 44 along the trailing edge structure 40. In the unfurled configuration, the left sail 42 and the right sail 44 provide symmetrical, triangular airfoil extensions of the wing 28. The left sail 42 and the right sail 44 may be constructed of any high strength, flexible material. In the preferred embodiment, the sails are constructed of cloth fabric reinforced with Mylar, Kevlar or nylon filaments.

Figure 3:
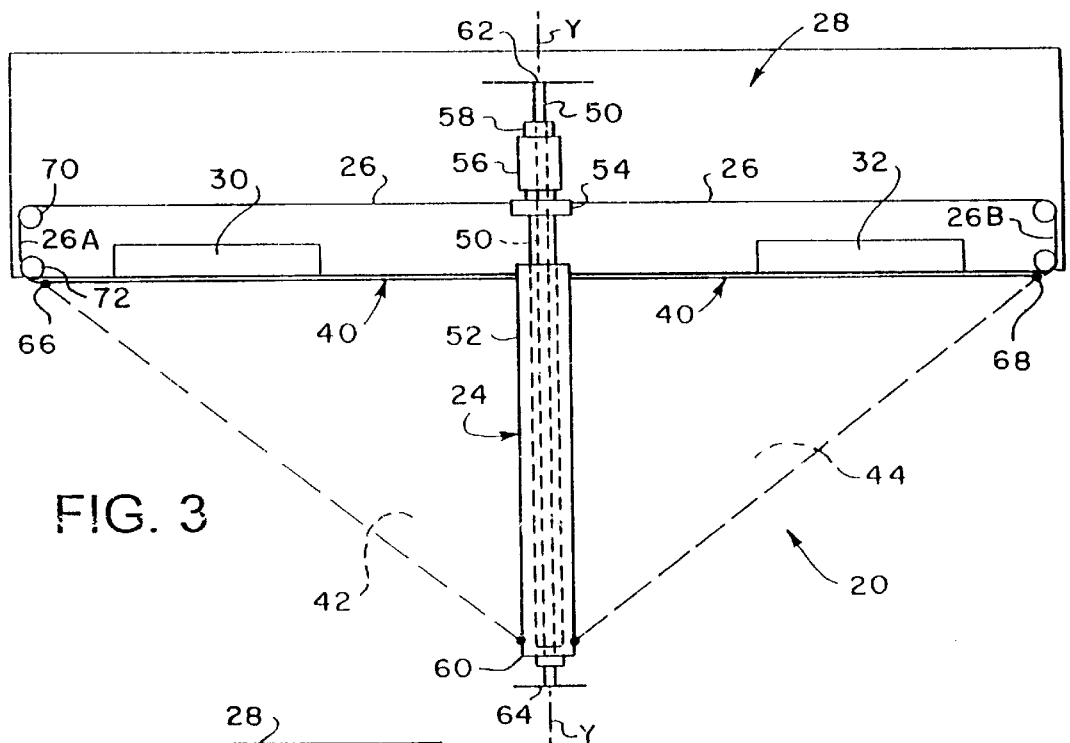
FIG. 3 is a top plan view of the retractable airfoil assembly.

FIG. 3 is a top view of the retractable airfoil assembly 20. The furling boom 24 includes a static tube 50 concentrically mounted within an outer winding tube or furling drum 52. Additionally, the retractable airfoil assembly includes a spring-biased cable drum 54, a drive motor 56, a bearing 58 and a bearing 60. A forward portion of the static tube 50 is attached at a connection 62 to a main wing spar of the wing 28. The aft portion of the static tube is attached at connection 64 to the base of the tail assembly 36. In the preferred embodiment of the present invention, the furling drum 52 is tubular and is supported for rotation on the static tube 50 by the bearings 58, 60. The static tube 50 provides stable support for the furling drum and sails. The furling drum 52 is radially spaced from the static tube 50 and is rotatable clockwise and counterclockwise about the Y axis on the bearings 58, 60.

The furling drum 52 is rotatably driven by the drive motor 56, which is located on a forward section of the support boom 24. However, in other embodiments, the drive motor 56 may be offset from the furling drum 52. The drive motor 56 is preferably a reversible D.C. electric motor but may be driven by other means, for example a hydraulic motor or pneumatic motor, or manually by a hand crank.

Opposite end portions of the drive cable 26 are attached to and are wound about the spring-biased cable drum 54. In addition to rotating the furling drum 52, the drive motor 56 also unreels the flexible drive cable 26 from the spring-biased cable drum 54. The sail drive cable end portions 26A, 26B are connected to the sails at sail/cable connections 66, 68, respectively, and maintain tension in the left sail 42 and the right sail 44 during retraction (furling) and extension (unfurling). The drive cable 26 is guided around pulleys 70 and 72 that are located on the left wing and pulleys 74 and 76 that are located on the right wing. The placement and number of pulleys utilized may change with different wing types. The flexible drive cable 26 and spring-biased cable drum 54 maintain tension in the left sail 42 and in the right sail 44 during recovery and deployment. The tension applied by the drive cable maintains the sails in a flat airfoil configuration when the sails are extended.

Figure 4:
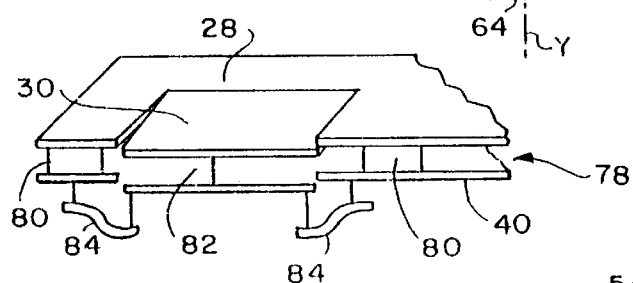
FIG. 4 is a rear perspective view of a track assembly for guiding a flexible sail along the trailing edge structure of an aircraft wing.

FIG. 4 illustrates a track assembly 78 for guiding the sails along the trailing edge 40 of the main aircraft wing. The track assembly 78 includes a main track 80, an aileron track 82, and flexible guide tracks 84. The main track 80 providing a channel to guide the sails and flexible drive cable 26 along the trailing edge structure 40, except for the aileron 30 section. The aileron track 82 is offset from the main track 80. The main track 80 and the aileron track 80 provide a guide channel along the trailing edge 40 through the utilization of flexible guide tracks 84.

The flexible guide tracks 84 are attached to both the main tracks 80 and the aileron track 82. The flexible guide tracks 84 are preferably constructed of flexible material, allowing free upward and downward movement of the aileron 30 while still providing a continuous channel for the flexible drive cable 26. In the preferred embodiment, the flexible guide tracks 84 are attached at laterally offset locations on each side of the junction between the aileron track 82 and the main track 80. By spacing the flexible guide tracks 84 from the junction between the aileron track 82 and the main track 80, the change in angle of the sail drive is reduced during deflection of the aileron 30.

Figure 6:
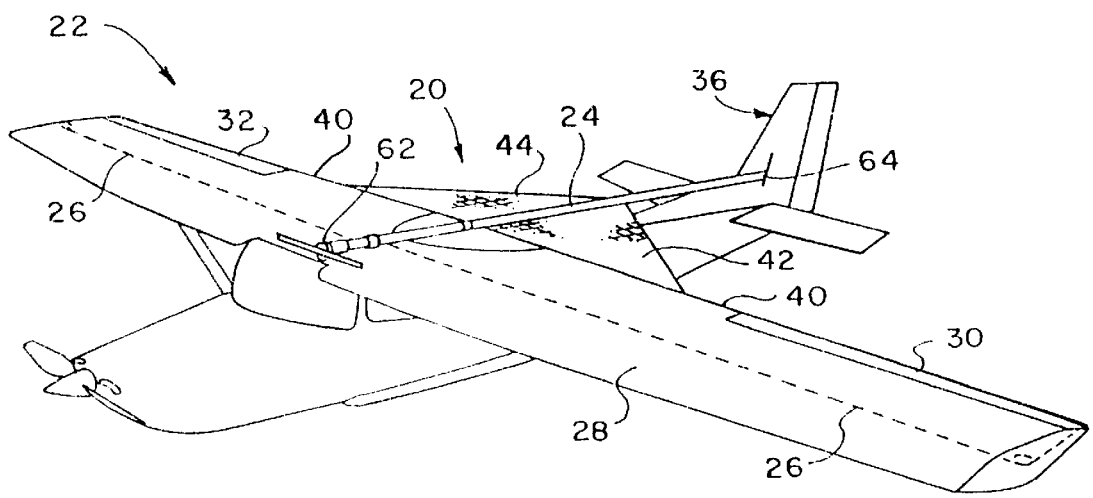
FIG. 6 is a front perspective view of the retractable airfoil assembly in a partially extended configuration along the trailing edge structure of an aircraft wing.
Figure 5:
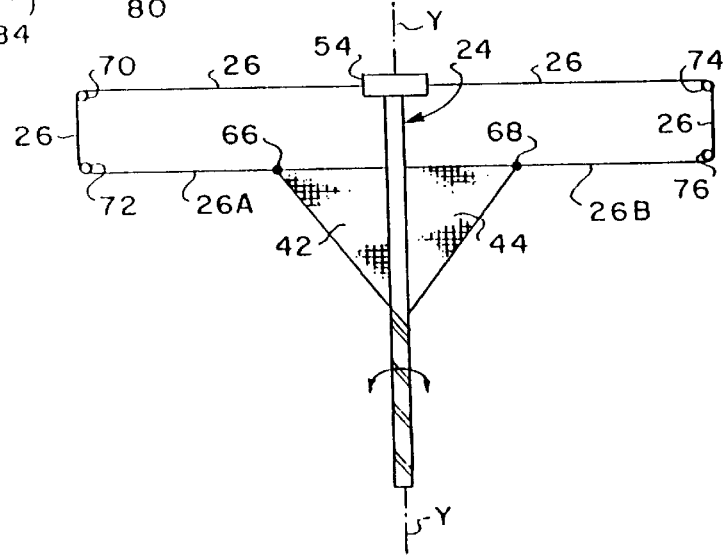
FIG. 5 is a top plan view of the retractable airfoil assembly in a partially unfurled configuration.

The retractable airfoil assembly 20 is shown in a partially unfurled configuration in FIG. 5. FIG. 6 also shows the retractable airfoil assembly 20 in a partially unfurled configuration. When a pilot desires to reduce the stall speed of the aircraft 22 (e.g., during takeoff or approach to landing), the flexible sails 42, 44 are partially or fully unfurled to increase the lifting surface area, thereby increasing the lifting force on the aircraft 22. The left sail 42 and the right sail 44 are deployed by the actuating motor 56 which rotates the furling drum 52 and rotates the spring-biased cable drum 54. The spring-biased cable drum 54, being coupled to the flexible drive cable 26, maintains tension in the flexible sails 42, 44. At the beginning of unfurling movement, the sails are spirally furled about the furling drum 52. Additionally, the sails are connected to the flexible drive cable 26 at laterally separated locations adjacent the support boom 24 along the trailing edge 40 at the sail/cable connections 66 and 68.

When the furling drum 52 is rotated and the flexible drive cable 26 is driven outboard along the trailing edge 40, the left sail 42 and the right sail 44 begin to unfurl and extend laterally (FIGS. 5 and 6). As is illustrated in FIG. 5, when the sails begin to unfurl, the sail/cable connections 66 and 68 are driven outboard along the main track 80 on the trailing edge 40. The spring-biased cable drum 54 pulls the flexible drive cable 26 via the pulleys 70–76, imposing tension forces in the left sail 42 and in the right sail 44.

If the fully unfurled (extended) configuration is desired, the motor 56 continues to rotate the furling drum 52 and retracts the flexible drive cable 26 around the spring-biased cable drum 54. The left sail 42 and the right sail 44 extend laterally outwardly along the trailing edge structure 40. When the sail/cable connections 66 and 68 are abeam the ailerons 30 and 32 respectively, the flexible drive cable 26 is guided through the transition from the main tracks 80 to the aileron tracks 82 by the flexible guide track 84. As the sail/cable connection 66 and 68 pass the outboard junction between the aileron tracks 82 and the main tracks 80, the flexible guide tracks 84 again guide the flexible drive cable 26.

FIG. 2 illustrates the flexible airfoil assembly 20 in the fully extended (unfurled) configuration. When fully deployed, the sail/cable connections 66 and 68 are at the fully extended outboard positions adjacent left wingtip 46 and right wingtip 48, respectively.

When the desired extensions of the left sail 42 and right sail 44 are attained, the drive motor 56 is stopped and the spring-biased cable drum 54 maintains tension in the left sail 42 and the right sail 44. The deflection of the ailerons, necessary for control of the aircraft 22, is not hindered by the flexible drive cable 26 because of the novel track arrangement along the trailing edge 40. The spring-biased cable drum 54 yields and flexible drive cable 26 deflects, allowing the ailerons 32 and 34 to properly deflect during flight. Additionally, the flexible guide tracks 84 guide the flexible drive cable 26 without hindering movement of the ailerons 30 and 32.

To recover the sails (e.g., during cruise flight operation), the actuating motor 56 is reversed to rotate the furling drum 52 in the opposite direction. Additionally, the spring-biased cable drum 54 yields to permit unwinding of the drive cable 26. As the furling drum 52 rotates, the left sail 42 and the right sail 44 spirally wrap around the furling drum 52 (FIG. 5). Additionally, the flexible drive cable end portions 26A, 26B are extended inboard toward the boom by the force exerted by the rotation of the sails around the furling drum 52, resulting in the sail/cable connections 66 and 68 being driven inboard along the trailing edge tracks. As described above, the flexible drive cable 26 is guided through the junctions between the aileron tracks 82 and the main tracks 80 by the flexible guide tracks 84. The flexible sails 42, 44 continue to wrap about the furling drum 52 until the sail/cable connections 66 and 68 reach the limit of inboard travel adjacent the support boom. When the retractable airfoil assembly 20 is in the fully furled configuration the drive motor 56 is stopped, and the spring-biased furling drum 52 retains the sails in the fully wrapped (furled) position (as shown in FIG. 1).

The flexible airfoil assembly 20 may be partially deployed depending on the specific flight characteristics desired by the pilot. Typically, the retractable airfoil assembly 20 is completely furled during cruise to reduce drag. In the preferred embodiment, flaps located on the trailing edge of an aircraft are disabled. Additionally, removal of the flaps reduces any complication in installing and using the main guide tracks 80 along the trailing edge 40.

Referring now to FIG. 7, a leading edge embodiment includes a retractable sail assembly 86, a rotatable furling boom 88, a sail drive cable 90, a left sail 92 and a right sail 94. FIG. 9 is a front perspective view of the retractable, airfoil assembly 86 in an unfurled, fully deployed configuration. The retractable airfoil assembly 86 is mounted on the underside of the main fuselage of an aircraft 96. The aircraft 96 has canard wings 98 mounted on the forward portion of the fuselage 100 and main wings 99 mounted on an aft portion of the fuselage. In this embodiment, the left sail 92 and the right sail 94 are extended along a leading edge 101 of the wings 99, rather than along the trailing edge as shown in FIG. 1. The sail drive cable 90 runs along main tracks (not shown) across the leading edge structure 101 of the main wings 99.

Figure 10:
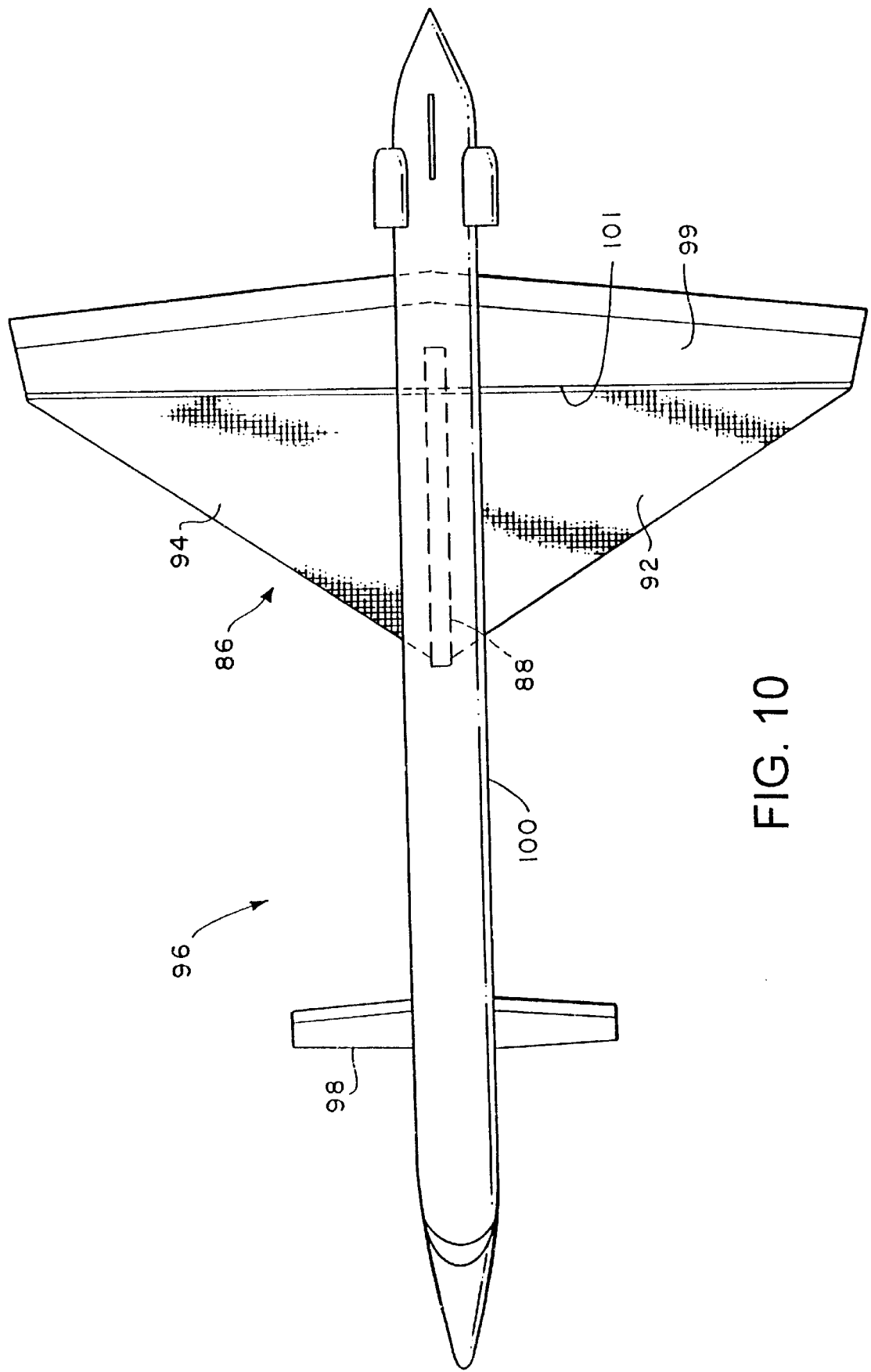
FIG. 10 is a top plan view of the low wing aircraft and retractable airfoil assembly of FIG. 9 in a fully, unfurled configuration, with the furling boom being attached beneath the main fuselage.
Figure 11:
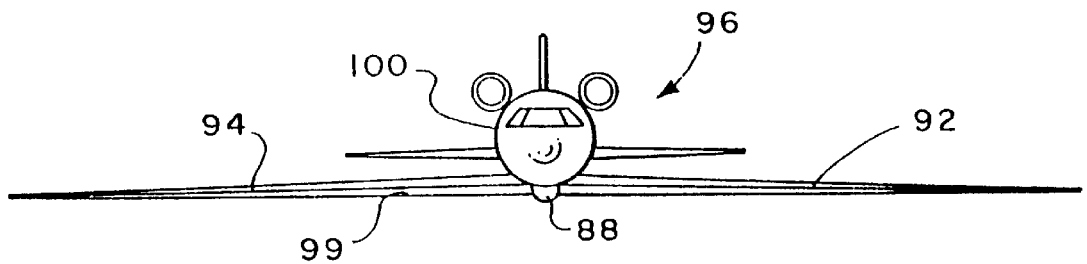
FIG. 11 is a front elevational view of the low wing aircraft and retractable airfoil assembly of FIG. 9; and, FIG. 12 is a simplified bottom plan view of a retractable airfoil assembly in a fully deployed, unfurled configuration attached to an aircraft employing two furling booms and dual sails in a split-wing, leading edge embodiment.

FIG. 10 and FIG. 11 show the retractable airfoil assembly 86 mounted on the underside of the fuselage 100 in the fully extended (deployed) configuration. The retractable airfoil assembly 86 operates in the same manner as described above in connection with the FIG. 2 embodiment.

Figure 12:
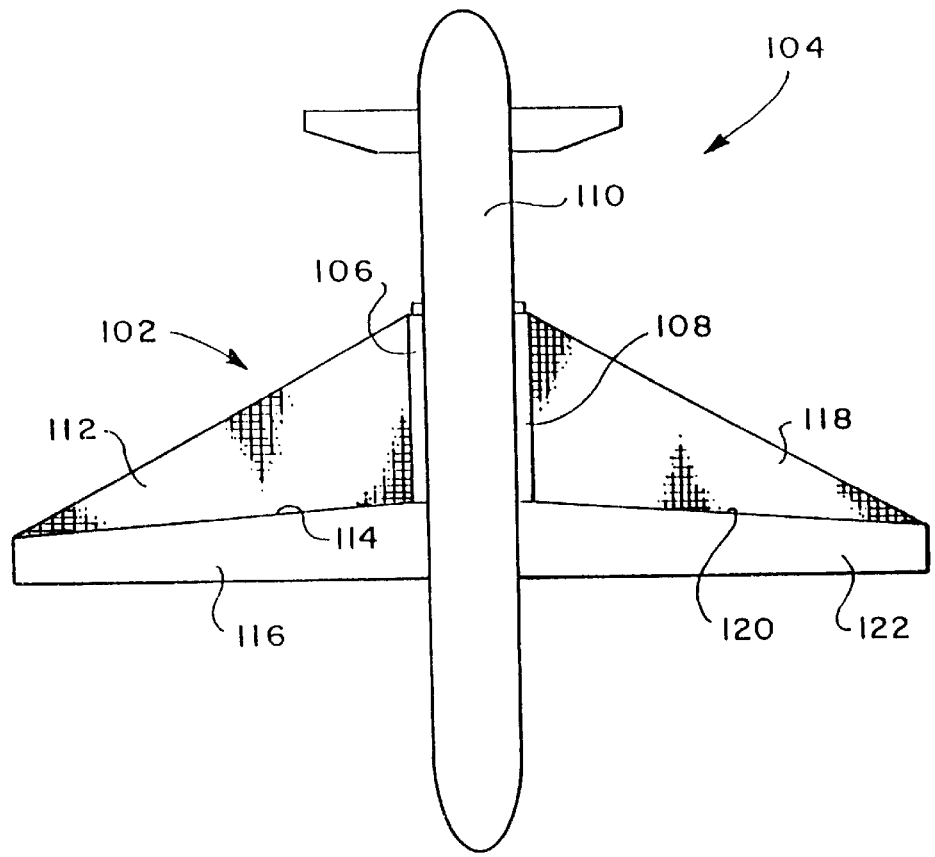

According to an alternative split-wing arrangement shown in FIG. 12, a retractable airfoil assembly 102 is attached to an aircraft 104 using left and right furling booms 106, 108 mounted along opposite sides of the main fuselage 100. Typically, the retractable airfoil assembly 102 is used on mid-wing aircraft where a central furling boom would not be feasible. The left furling boom 106 is mounted for rotation on the left side of the fuselage 110. A left sail 112 is extended and deployed aft of the left side of a leading edge structure 114 of a wing 116 from the left wingtip to the left furling boom 106 and extends diagonally to the aft end portion of the left furling boom 106. The right sail 118 is constructed in mirror image relation to the left sail 112 and runs aft of the right side of the trailing edge structure 120 of a wing 122 from the right wingtip to the right furling boom 108 and also extends diagonally to the aft end portion of the right furling boom 108. The left sail 112 is rigidly attached to the left furling boom 106 and the right sail 118 is rigidly attached to the right furling boom 108. In operation, guide cables and spring-loaded cable drums extend and retract the flexible sails 112, 118 simultaneously along guide tracks in a manner similar to that described in connection with the central furling boom embodiment of FIG. 5.

INDUSTRIAL APPLICABILITY

The retractable airfoil assembly of the present invention can be installed on a retrofit basis on a fixed wing aircraft such as the Cessna 172. The weight added by the typical retrofit installation is less than 100 pounds (about 45 kilograms). The center of gravity for the trailing edge embodiment of FIG. 1 is shifted aft, but the shift is not significant when the sails are retracted. When the sails are deployed, the center of gravity moves forward, but is well within the handling cap ability of the rear stabilizer.

In the typical fixed wing aircraft installation, the combined airfoil surface area of the flexible sails is approximately 200 square feet (about 18 square meters).

For aircraft comparable to the Cessna 172, the flexible sails can be deployed in flight at speeds not to exceed about 55 knots (about 102 kilometers/hour).

When retrofitted on a Cessna 172, the flexible sails, when fully deployed, permit takeoff and landing operations at 20–30 knots (about 27–55 kilometers/hour) and a rate of climb of 1200 feet per minute (about 365 meters/minute) at full power and 700 feet per minute (about 213 meters/minute) at 65 percent power.

The retractable airfoil assembly of the present invention provides significant flight benefits. When the sails are fully deployed, the wing area is increased, resulting in increased lift. The increased lift enables the aircraft to takeoff at slower speeds without stalling. Slower speeds on approach can provide shorter landing rolls. Additionally, slower landing speeds result in less wear and tear on the undercarriage of the aircraft (e.g., tires, landing gear and struts). Moreover, the takeoff roll will be reduced since the aircraft can rotate at a slower speed, thus reducing requirements for longer runways. The aircraft can also climb at slower speeds, at greater climb angles, which may be useful in noise sensitive areas or where the glide path adjacent the end of the runway is obstructed.

The retractable sail assembly is relatively light, which is critical on a weight sensitive, fully loaded aircraft. Additionally, the retractable airfoil assembly can be retrofit to fixed wing aircraft with minimal modifications.

It is believed that the construction, operation and advantages of the present invention will be apparent from the foregoing description. While the apparatus shown and described has been characterized as being preferred, it will be understood that various changes and modifications may be made therein without departing from the spirit and scope of the invention as defined by the appended claims.

What is claimed is:

1. A retractable airfoil assembly for selectively increasing the lift surface area of an aircraft of the type including a fixed wind structure comprising:

a furling drum mounted on the aircraft for rotation about a longitudinal axis;

a guide track disposed along the fixed wing structure;

first and second flexible sails movable coupled to the guide track and wrapped one over the other in overlapping relation around the furling drum;

sail drive apparatus attached to the sails for moving the sails along the guide tracks, the sail drive apparatus comprising a rotatable cable drum and a drive cable wound about the retractable cable drum, the drive cable including a first end portion and a second end portion attached to the first sail and the second sail, respectively; and rotary drive apparatus coupled to the furling drum for rotating it clockwise and counterclockwise.

2. A retractable airfoil assembly as set forth in claim 1, characterized in that each flexible sail when unfurled forms a triangular airfoil extension of the wing structure, each sail including a side portion attached to the furling drum and an end portion coupled to the drive apparatus.

3. A retractable airfoil assembly as set forth in claim 1, characterized in that:

a static tube is mounted on the aircraft and the furling drum is mounted for rotation on the static tube.

4. A retractable airfoil assembly as set forth in claim 1, characterized in that the drive apparatus is a reversible D.C. electrical motor.

5. A retractable airfoil assembly as set forth in claim 1, characterized in that the drive apparatus is a manually operated hand crank.

6. A retractable airfoil assembly as set forth in claim 1, characterized in that the drive apparatus is coupled to each sail and to the furling drum for moving each sail along the guide tract while simultaneously rotating the furling drum as the sails are furled and unfurled in a spiral pattern around the drum.

7. A retractable airfoil assembly as set forth in claim 1, characterized in that the guide track is disposed along a leading edge of the fixed wing structure.

8. A retractable airfoil assembly as set forth in claim 1, characterized in that the guide track includes a main guide track disposed along a trailing edge of the fixed wing structure.

9. A retractable airfoil assembly as set forth in claim 8, characterized in that:

an aileron track is disposed along the trailing edge of the fixed wing structure; and, a flexible guide track is disposed intermediate the aileron track and the main guide track.

10. A retractable airfoil assembly as set forth in claim 1, characterized in that:

the furling drum and the cable drum are mechanically linked together for concurrent rotation.

11. A retractable airfoil assembly as set forth in claim 1, including a static boom mounted on the aircraft, the furling drum being mounted for rotation on the static boom.

* * * * *

UNITED STATES PATENT AND TRADEMARK OFFICE
CERTIFICATE OF CORRECTION

PATENT NO. : 6,241,195 B1                                                   Page 1 of 1
DATED : June 5, 2001
INVENTOR(S) : Fred A. Wagner, III It is certified that error appears in the above-identified patent and that said Letters Patent is hereby corrected as shown below:

<u>Claims,</u>
<u>Column 8,</u>
Line 7, "wind" should be -- wing --

Signed and Sealed this

Eighth Day of January, 2002

Attest:

Attesting Officer

JAMES E. ROGAN
Director of the United States Patent and Trademark Office